United States Patent
Tokito

(10) Patent No.: US 8,844,394 B2
(45) Date of Patent: Sep. 30, 2014

(54) TRANSMISSION FOR SADDLE TYPE VEHICLE

(75) Inventor: Akira Tokito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 13/423,911

(22) Filed: Mar. 19, 2012

(65) Prior Publication Data

US 2012/0240702 A1   Sep. 27, 2012

(30) Foreign Application Priority Data

Mar. 22, 2011   (JP) ................. 2011-062205

(51) Int. Cl.
*F16H 63/18*   (2006.01)
*B60K 17/06*   (2006.01)
*F16H 59/70*   (2006.01)
*F16H 61/18*   (2006.01)

(52) U.S. Cl.
CPC ............ *F16H 59/70* (2013.01); *F16H 61/18* (2013.01)
USPC ...................................... 74/337.5

(58) Field of Classification Search
USPC .................... 74/335, 337.5, 473.3
See application file for complete search history.

(56) References Cited

U.S. PATENT DOCUMENTS 7,770,481 B2 *   8/2010   Takemoto et al. ........... 74/337.5

FOREIGN PATENT DOCUMENTS

JP   2008-215554 A   9/2008
JP   2008-298089   * 12/2008

* cited by examiner

*Primary Examiner* — William C Joyce

(74) *Attorney, Agent, or Firm* — Birch, Stewart, Kolasch & Birch, LLP

(57) ABSTRACT

In a transmission for a saddle type vehicle wherein a shift position sensor for detecting the angular position of a shift drum has a sensor shaft disposed coaxially with the shift drum and wherein an engaging pin disposed along a plane orthogonal to the center axis of the sensor shaft and inserted and passed through and fixed to the sensor shaft is engaged with an engagement groove provided at one axial end of the shift drum, to restrain abrasion or torsion from occurring between the engagement groove and the engaging pin even if a radial load is exerted on the shift drum at the time of a shift change and thereby to promise enhanced durability. The longitudinal direction of the engagement groove is set in a direction orthogonal to the direction in which the greatest one of radial loads on the shift drum is exerted.

17 Claims, 8 Drawing Sheets

TRANSMISSION FOR SADDLE TYPE VEHICLE

CROSS-REFERENCE TO RELATED APPLICATIONS

The present application claims priority under 35 USC 119 to Japanese Patent Application No. 2011-062205 filed Mar. 22, 2011 the entire contents of which are hereby incorporated by reference.

BACKGROUND OF THE INVENTION

1. Field of the Invention

The present invention relates to a transmission for a saddle type vehicle, including gear trains for a plurality of shift positions by which an output of an engine is outputted through stepwise speed change. A shift drum has at its outer periphery a plurality of guide grooves for individual engagement with a plurality of shift forks for changeover of selective establishment of the gear trains and is turnably borne on a crankcase of the engine. A shift position sensor has a sensor shaft disposed coaxially with the shift drum and is operative to detect the angular position of the shift drum as an indication of which one of the gear trains for the plurality of shift positions is established. An engaging pin is disposed along a plane orthogonal to the center axis of the sensor shaft and is inserted and passed through the sensor shaft. An engagement groove for engagement with the engaging pin is provided at one axial end of the shift drum.

2. Description of Background Art

A transmission for a saddle type vehicle is known wherein a shift drum is rotationally driven by an electric motor is provided at one end thereof with an engagement groove, and an engaging pin, inserted and passed through a sensor shaft possessed by a shift position sensor mounted to a crankcase, is engaged with the engagement groove. See, for example, Japanese Patent Laid-open No. 2008-215554.

When a shift drum is rotationally driven by a shift pedal operation at the time of a shift change, a load may be exerted radially on the shift drum due, for example, to repulsion arising from collision between an engagement projection on the shift fork side and a side surface of the guide groove in the outer periphery of the shift drum. In the configuration disclosed in Japanese Patent Laid-open No. 2008-215554, the shift drum is rotationally driven by the electric motor to thereby perform a shift change, so that the radial load exerted on the shift drum can be reduced by controlling the output torque of the electric motor. However, in a transmission for a saddle type vehicle wherein a shift drum is turned by a manual operation in such cases as manual shifting, it is difficult to control the radial load exerted on the shift drum. Thus, the shift drum may possibly be displaced in the radial direction. In this case, in a structure wherein an engaging pin inserted and passed through a sensor shaft possessed by a shift position sensor is engaged with an engagement groove provided at one axial end of the shift drum, coincidence of the direction of the load exerted radially on the shift drum with the longitudinal direction of the engagement groove may cause a relative displacement of the engagement groove and the engaging pin along the longitudinal direction of the engagement groove, which in turn may cause abrasion, torsion or the like.

SUMMARY AND OBJECTS OF THE INVENTION

The present invention has been made in consideration of the above circumstances. Accordingly, it is an object of an embodiment of the present invention to provide a transmission for a saddle type vehicle by which it is ensured that when a radial load is exerted on a shift drum at the time of a shift change, abrasion or torsion can be restrained from occurring between an engagement groove and an engaging pin and enhanced durability is promised.

In order to attain the above object, according to an embodiment of the present invention, a transmission for a saddle type vehicle is provided that includes gear trains for a plurality of shift positions by which an output of an engine is outputted through stepwise speed change. A shift drum includes an outer periphery with a plurality of guide grooves for individual engagement with a plurality of shift forks for changeover of the selective establishment of the gear trains and which is turnably borne on a crankcase of the engine. A shift position sensor has a sensor shaft disposed coaxially with the shift drum and is operative to detect the angular position of the shift drum as an indication of which one of the gear trains for the plurality of shift positions is established, with an engaging pin disposed along a plane orthogonal to a center axis of the sensor shaft being inserted and passed through and fixed to the sensor shaft, and with an engagement groove for engagement with the engaging pin being provided at one axial end of the shift drum, a longitudinal direction of the engagement groove is set in a direction orthogonal to a direction in which a greatest one of radial loads on the shift drum is exerted.

In addition, according to an embodiment of the present invention, a plurality of shift positions inclusive of a LOW position for establishing the gear train for a lowest shift position and a neutral position for establishing none of the gear trains for the plurality of shift positions are set at a plurality of parts located at intervals along the circumferential direction of the shift drum, one end of the guide groove for engagement with the shift fork relating to selective establishment of the gear train for the lowest shift position, of the plurality of shift forks, is closed at the LOW position, and the direction in which the greatest one of the radial loads is exerted is set as a direction of interconnection of a center axis of the shift drum and the LOW position.

According to an embodiment of the present invention, the engagement groove is formed at a shaft end of a shaft portion which the shift drum integrally and coaxially possesses at one axial end thereof. The shaft portion is fitted in and supported by a support hole provided in the crankcase, in such a manner that lubricating oil is supplied into a clearance between the shaft portion and an inner periphery of the support hole.

According to an embodiment of the present invention, the engaging pin is press fitted into the sensor shaft, and the depth of the engagement groove along an axial direction of the shift drum is set so that the engagement groove is located between both axial ends of the support hole.

According to an embodiment of the present invention, the width-directional center of the engagement groove and a center axis of the engaging pin are disposed at a position deviated from the center axis of the shift drum and the sensor shaft.

According to an embodiment of the present invention, a corner portion of the engagement groove on one axial end side of the shift drum is formed with a chamfer portion.

According to an embodiment of the present invention, flat planes are provided on which both longitudinal ends of the engagement groove front are each formed by removing a part of an outer peripheral surface of the shaft portion.

According to an embodiment of the present invention, the engaging pin is fixed to the sensor shaft in such a manner that both ends of the engaging pin protrude from an outer periphery of the sensor shaft by different amounts.

According to an embodiment of the present invention, the longitudinal direction of the engagement groove is set in a direction orthogonal to the direction in which the greatest one of the radial loads on the shift drum is exerted. Even if a great radial load is exerted on the shift drum, therefore, a relative displacement between the engagement groove and the engaging pin along the longitudinal direction of the engagement groove would not occur. Accordingly, abrasion or torsion can be restrained from occurring between the engagement groove and the engaging pin, and enhanced durability is promised.

In addition, according to an embodiment of the present invention, one end of the guide groove for engagement with the shift fork relating to selective establishment of the gear train for the lowest shift position is closed at the LOW position, and the direction of interconnection of the center axis of the shift drum and the LOW position is set as the direction in which the greatest one of the radial loads is exerted. Therefore, the thus set direction is optimum as the direction in which the greatest one of the radial loads on the shift drum is exerted, and durability can be thereby enhanced. More specifically, other than the LOW position, the TOP position is also a position, along the circumferential direction of the shift drum, at which end portions of the guide grooves are closed. Therefore, at the TOP position, also, a comparatively great radial load acts on the shift drum. However, since the LOW position is used more frequently than the TOP position and the load at the time of down shift by treading-on is great at the LOW position, the selection of the LOW position for the setting of the direction in which the greatest one of the radial loads on the shift drum is exerted is optimum, and durability can thereby be enhanced, as compared with the case where the TOP position is selected for the setting.

According to an embodiment of the present invention, the engagement groove is formed at the shaft end of the shaft portion which the shift drum integrally and coaxially possesses at one axial end thereof. In addition, the support hole in which to fit and support the shaft portion is provided in the crankcase, and the lubricating oil is supplied into a clearance between the support hole and the shaft portion. Therefore, the lubricating oil supplied into the clearance between the inner periphery of the support hole and the outer periphery of the shaft portion can be guided to the shaft end of the shaft portion, and supplied into the clearance between the engagement groove and the engaging pin.

According to an embodiment of the present invention, the engagement groove is located between both axial ends of the support hole. Even if the engaging pin press fitted in the sensor shaft is displaced in a direction for slipping out of the sensor shaft, therefore, movement of the engaging pin is restricted by the inner periphery of the support hole, so that the engaging pin is inhibited from being disengaged from the sensor shaft. Consequently, connection of the shift position sensor to the shift drum is maintained.

According to an embodiment of the present invention, the width-directional center of the engagement groove and the center axis of the engaging pin are deviated from the center axis of the shift drum and the sensor shaft. This ensures that in connecting the shift position sensor to the shift drum, an error in the angular position of the shift position sensor relative to the shift drum can be prevented from being generated in assemblage.

According to an embodiment of the present invention, the corner portion of the engagement groove on one axial end side of the shift drum is formed with the chamfer portion. In engaging the engaging pin with the engagement groove, therefore, the engaging pin can be guided by the chamfer portion, whereby the engaging operation can be facilitated.

According to an embodiment of the present invention, both longitudinal ends of the engagement groove front on the flat surfaces which are each formed by removing a part of the outer peripheral surface of the shaft portion. Therefore, burrs generated upon machining of the engagement groove can be securely removed by the formation of the flat surfaces, whereby smooth turning of the shift drum can be ensured.

According to an embodiment of the present invention, the amount of protrusion of both ends of the engaging pin from the outer periphery of the sensor shaft are different from each other. This ensures that the angular position of the shift position sensor relative to the shift drum can be easily confirmed by visual observation. Accordingly, mis-assembly of the shift position sensor can be prevented from occurring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
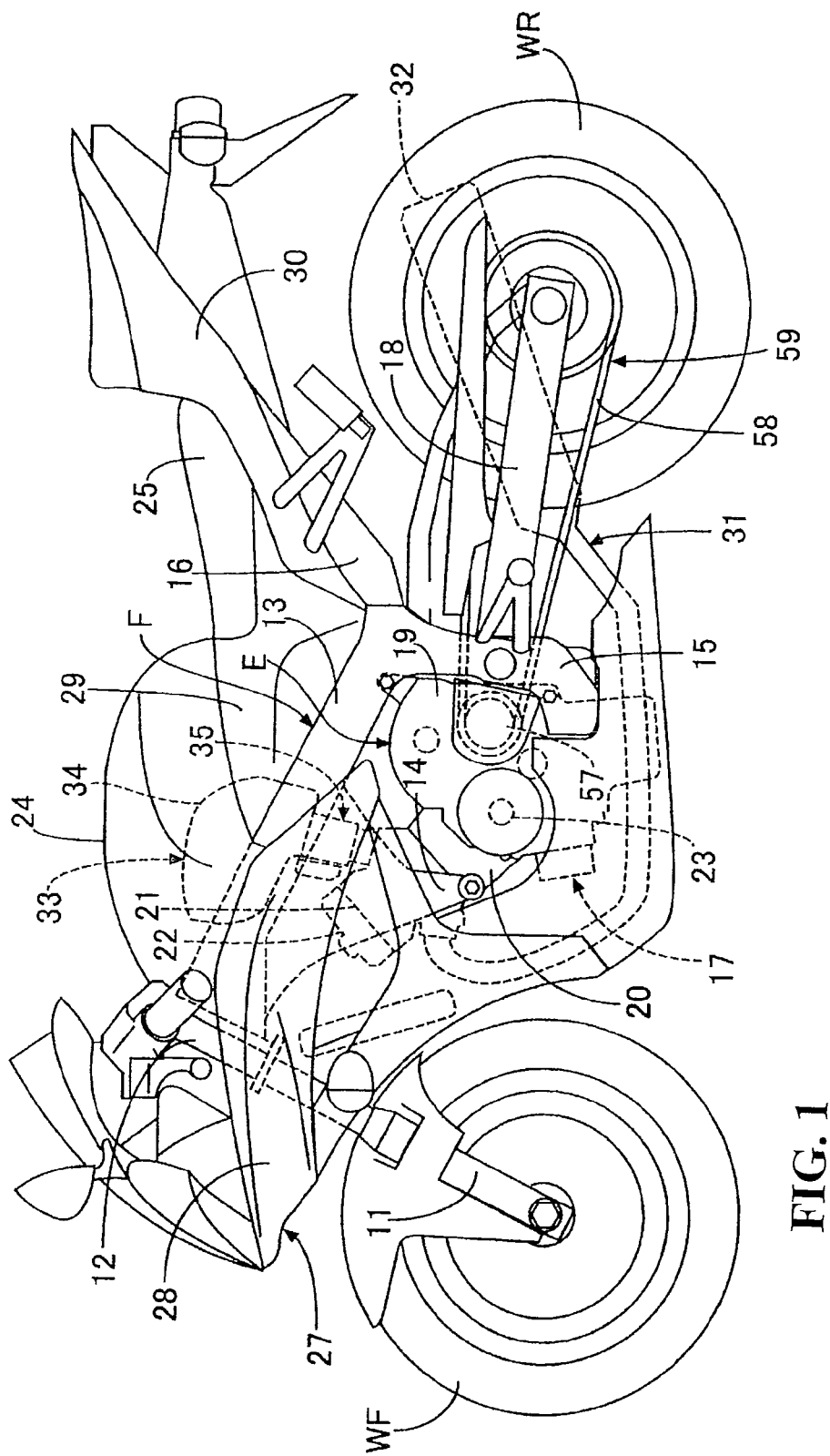
FIG. 1 is a side view of a motorcycle.

An embodiment of the present invention will now be described referring to the accompanying drawings, namely, FIGS. 1 to 9. As illustrated in FIG. 1, a body frame F of a motorcycle as a saddle type vehicle includes a head pipe 12 steerably bearing a front fork 11 by which a front wheel WF is rotatably supported; a main frame 13 extending rearwardly downward from the head pipe 12; engine hangers 14 drooping down from front portions of the main frame 13; a pivot frame 15 extending downward from a rear portion of the main frame 13 and seat rails 16 extending rearwardly upward from a rear portion of the main frame 13.

An engine body 17 of an engine E disposed under the main frame 13 is supported by a rear portion of the main frame 13, lower portions of the engine hangers 14 and a lower portion of the pivot frame 15, of the body frame F. A swing arm 18 rotatably supporting at its rear end portion a rear wheel WR driven by power generated by the engine E is rotatably borne at its front end portion on a lower portion of the pivot frame 15 so that it can be swung upward and downward. A fuel tank 24 is mounted on the main frame 13 on the upper side of the engine E. A rider seat 25 disposed rearwardly of the fuel tank 24 is supported by the seat rails 16.

A part of the engine E and a part of the body frame F are covered with a body cover 27. The body cover 27 includes a front cowl 28, a pair of left and right side covers 29 . . . disposed between the fuel tank 24 and the rider seat 25 so as to cover a rear lower portion of the fuel tank 24 on both lateral sides of the latter, and a rear cowl 30 being continuous with rear portions of both the side covers 29 . . . and extending rearwardly and upwardly.

Figure 2:
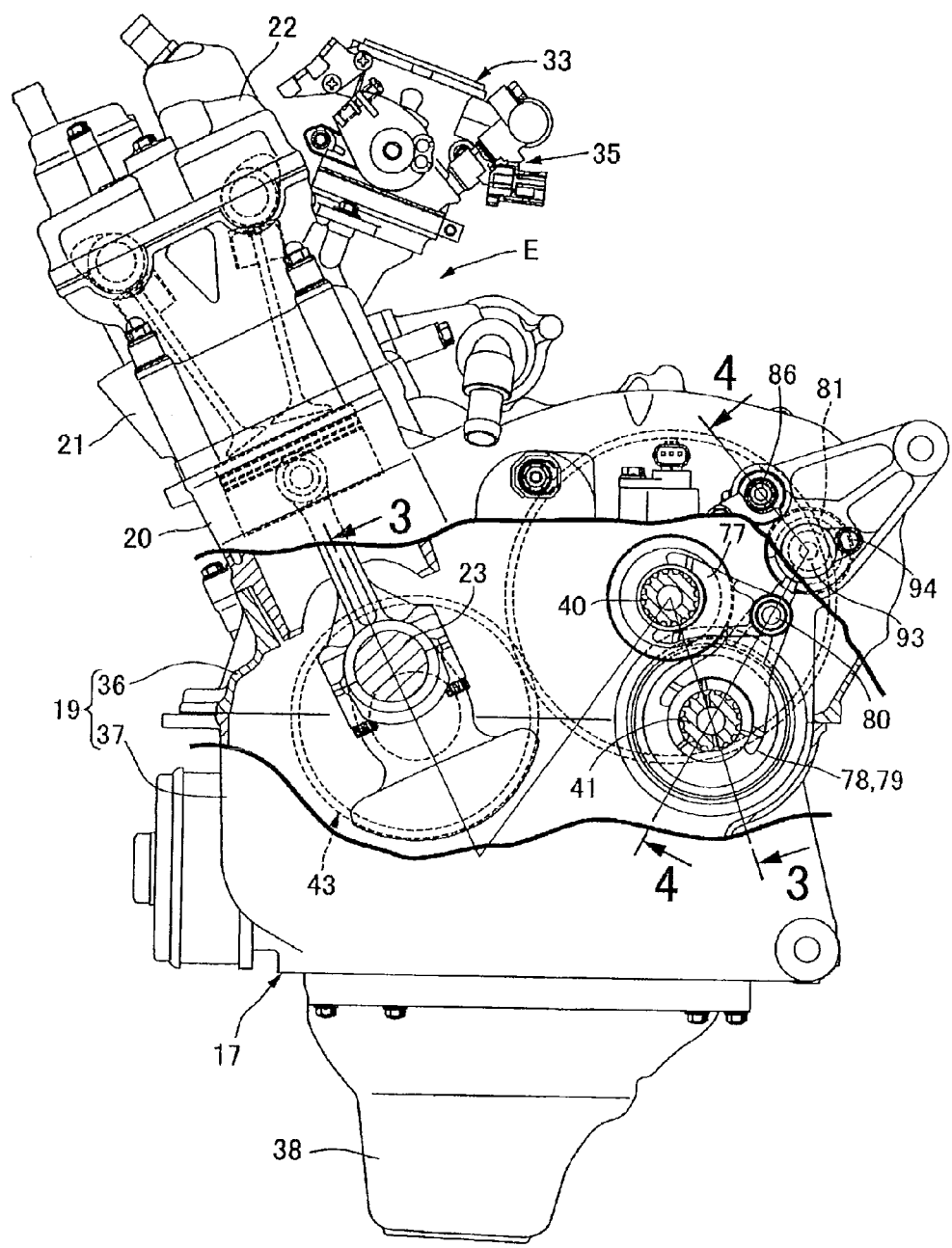
FIG. 2 is a partly cut-out side view of an engine.

Referring to FIG. 2, the engine body 17 of the engine E has, for example, an in-line 4-cylinder configuration, and includes a crankcase 19 on which to rotatably bear a crankshaft 23 having an axis extending in the width direction of the body frame F; a cylinder body 20 connected to a front upper end of the crankcase 19, with a cylinder axis inclined forward; a cylinder head 21 connected to the upper end of the cylinder body 20 and a head cover 22 connected to the upper end of the cylinder head 21.

The crankcase 19 has a structure in which an upper case half 36 integral with the cylinder body 20 and a lower case half 37 are coupled to each other. The crankshaft 23 is rotatably borne between joint surfaces of the upper case half 36 and the lower case half 37. An oil pan 38 is connected to the crankcase 19.

An exhaust system 31 connected to a front side surface of the cylinder head 21 is provided at its rear end with an exhaust muffler 32, which is disposed on the right side of the rear wheel WR. A rear side surface of the cylinder head 21 faces obliquely toward a rear upper side. An intake system 33 connected to the rear side surface of the cylinder head 21 includes an air cleaner 34 disposed on the upper side of the head cover 22 while being covered with the fuel tank 24, and a throttle device 35 interposed between the air cleaner 34 and the cylinder head 21.

Figure 3:
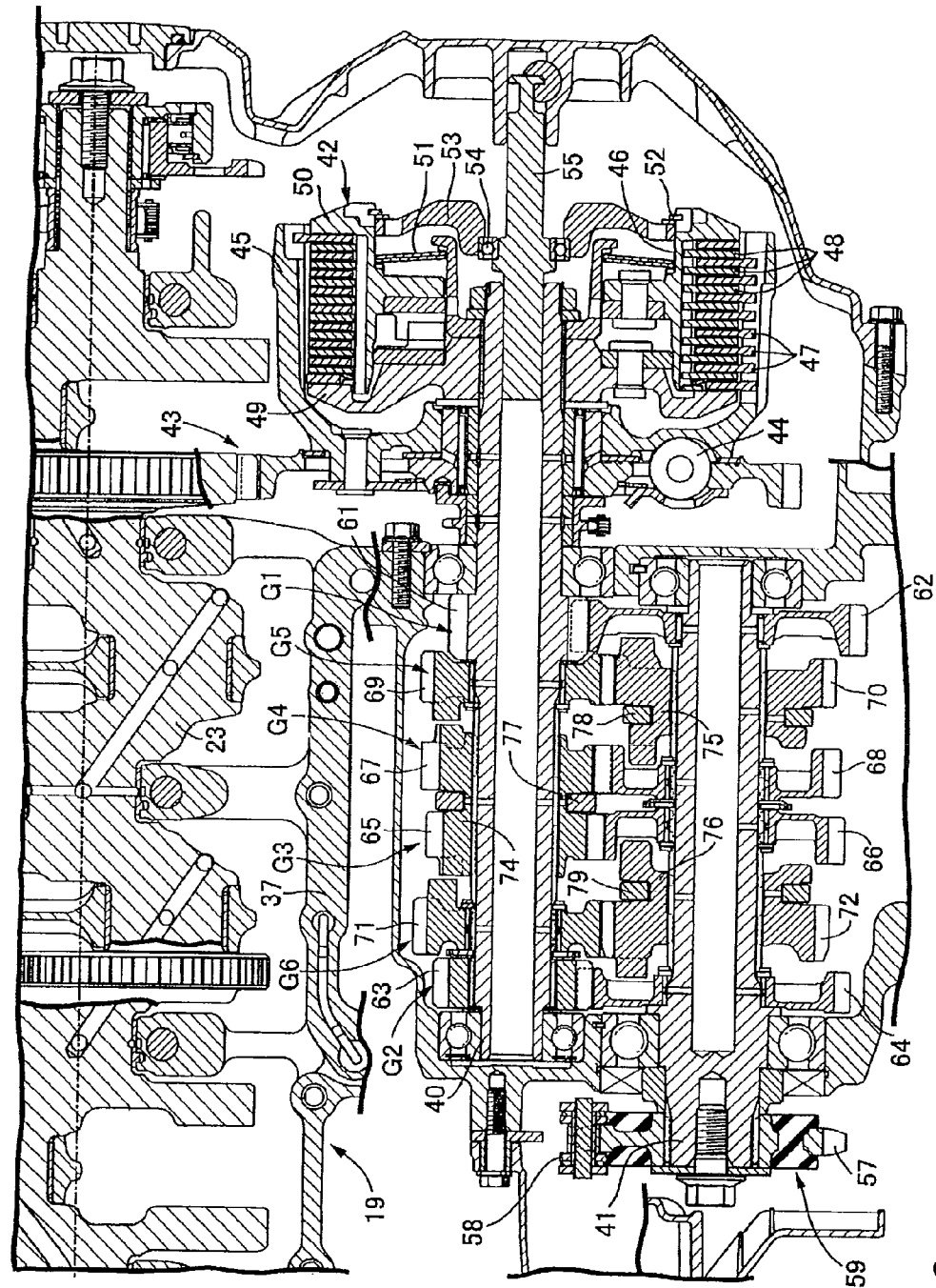
FIG. 3 is a sectional view taken along line 3-3 of FIG. 2.

In FIG. 3, a main shaft 40 and a counter shaft 41 which have mutually parallel axes are rotatably borne on the crankcase 19. Gear trains for a plurality of shift positions, for example, gear trains G1, G2, G3, G4, G5, G6 for six speeds (first to sixth gear speeds) are provided on these shafts, and the first-speed to sixth-speed gear trains G1 to G6 are contained in the crankcase 19.

Between one end of the crankshaft 23 and the main shaft 40, a clutch 42 is provided which is engaged and disengaged to switch the power transmission. The clutch 42 includes a clutch outer 45 to which power is transmitted from the crankshaft 23 through a primary reduction gear 43 and a torque damper 44; a clutch inner 46 disposed in a central portion of the clutch outer 45 and connected to the main shaft 40 so as to be incapable of relative rotation; a plurality of drive friction plates 47 . . . axially slidably spline-fitted to an inner peripheral wall of the clutch outer 45; a plurality of driven friction plates 48 . . . stacked alternately with the drive friction plates 47 . . . and axially slidably spline-fitted to the outer periphery of the clutch inner 46; a pressure receiving plate 49 relatively non-rotatably connected to the main shaft 40 so as to receive the innermost drive friction plates 47; a pressing plate 50 provided integrally with the outer end of the clutch inner 46 so as to be capable of pressing the outermost drive friction plates 47 and a clutch spring 51 biasing the pressing plate 50 toward the side of the pressure receiving plate 49.

When the drive friction plates 47 . . . and the driven friction plates 48 . . . are clamped between the pressing plate 50 and the pressure receiving plate 49 with a biasing force of the clutch spring 51, the clutch 42 is put in a clutch-ON state (power-transmitting state) in which the clutch outer 45 and the clutch inner 46 are friction coupled to each other.

In a central portion of the clutch inner 46, an annular plate-like release member 53 is disposed which has an outer peripheral portion engaged, from the axially inner side, with a stop ring 52 provided on the clutch inner 46. In addition, a push rod 55 is axially movably inserted in the main shaft 40, with a release bearing 54 interposed between the push rod 55 and the inner periphery of the release member 53. With the push rod 55 moved toward a side for reducing the amount of insertion into the main shaft 40, the pressing plate 50 is retracted against the spring force of the clutch spring 51. As a result, the drive friction plates 47 . . . and the driven friction plates 48 . . . are set in a free state, and the clutch 42 is put in a clutch-OFF state (power-intercepting state) in which the clutch outer 45 and the clutch inner 46 are out of connection.

A part of the counter shaft 41 protrudes from the crankcase 19 on the side opposite to the clutch 42 side, and a drive sprocket 57 is fixed to the end portion of the counter shaft 41 protruding from the crankcase 19. The drive sprocket 57 constitutes part of power transmission means 59, together with an endless chain 58 which is wrapped around the drive sprocket 57. Power outputted from the counter shaft 41 is transmitted through the power transmission means 59 to the rear wheel WR.

Meanwhile, the first-speed gear train G1 includes a first-speed drive gear 61 formed integrally with the main shaft 40, and a first-speed driven gear 62 which is relatively rotatably mounted on the counter shaft 41 and meshes with the first-speed drive gear 61. The second-speed gear train G2 includes a second-speed drive gear 63 relatively non-rotatably mounted on the main shaft 40, and a second-speed driven gear 64 which is rotatable relative to the counter shaft 41 and meshes with the second-speed drive gear 63. The third-speed gear train G3 includes a third-speed drive gear 65 non-rotatable relative to the main shaft 40, and a third-speed driven gear 66 which is relatively rotatably mounted on the counter shaft 41 and meshes with the third-speed drive gear 65. The fourth-speed gear train G4 includes a fourth-speed drive gear 67 non-rotatable relative to the main shaft 40, and a fourth-speed driven gear 68 which is relatively rotatably mounted on the counter shaft 41 and meshes with the fourth-speed drive gear 67. The fifth-speed gear train G5 includes a fifth-speed drive gear 69 relatively rotatably mounted on the main shaft 40, and a fifth-speed driven gear 70 which is non-rotatable relative to the counter shaft 41 and meshes with the fifth-speed drive gear 69. The sixth-speed gear train G6 includes a sixth-speed drive gear 71 relatively rotatably mounted on the main shaft 40, and a sixth-speed driven gear 72 which is non-rotatable relative to the counter shaft 41 and meshes with the sixth-speed drive gear 71.

One end of the guide groove for engagement with the shift fork relating to selective establishment of the gear train for the lowest shift position, of the plurality of shift forks, is closed at the LOW position, and the direction in which the greatest one of the radial loads is exerted coincides with the direction of interconnection of the center axis of the shift drum and the LOW position. Between the fifth-speed drive gear 69 and the sixth-speed drive gear 71, a fifth-speed/sixth-speed changeover shifter 74 is axially slidably spline-fitted to the main shaft 40. The third-speed drive gear 65 is formed integrally with the fifth-speed/sixth-speed changeover shifter 74 so as to be opposed to the sixth-speed drive gear 71, and the fourth-speed drive gear 67 is formed integrally with the fifth-speed/sixth-speed changeover shifter 74 so as to be opposed to the fifth-speed drive gear 69. In addition, between the first-speed driven gear 62 and the fourth-speed driven gear 68, a first-speed/fourth-speed changeover shifter 75 formed integrally with the fifth-speed driven gear 70 is axially slidably spline-fitted to the counter shaft 41. Further, between the second-speed driven gear 64 and the third-speed driven gear 66, a second-speed/third-speed changeover shifter 76 formed integrally with the sixth-speed driven gear 72 is axially slidably spline-fitted to the counter shaft 41.

When the fifth-speed/sixth-speed changeover shifter 74 is slid in the axial direction to be engaged with the fifth-speed drive gear 69, the fifth-speed drive gear 69 is relatively non-rotatably connected to the main shaft 40 through the fifth-speed/sixth-speed changeover shifter 74, whereby the fifth-speed gear train G5 is established. When the fifth-speed/sixth-speed changeover shifter 74 is slid in the axial direction to be engaged with the sixth-speed drive gear 71, the sixth-speed drive gear 71 is relatively non-rotatably connected to the main shaft 40 through the fifth-speed/sixth-speed changeover shifter 74, whereby the sixth-speed gear train G6 is established.

When the first-speed/fourth-speed changeover shifter 75 is slid in the axial direction to be engaged with the first-speed driven gear 62, the first-speed driven gear 62 is relatively non-rotatably connected to the counter shaft 41 through the first-speed/fourth-speed changeover shifter 75, whereby the first-speed gear train G1 is established. In addition, when the first-speed/fourth-speed changeover shifter 75 is slid in the axial direction to be engaged with the fourth-speed driven gear 68, the fourth-speed driven gear 68 is relatively non-rotatably connected to the counter shaft 41 through the first-speed/fourth-speed changeover shifter 75, whereby the fourth-speed gear train G4 is established.

When the second-speed/third-speed changeover shifter 76 is slid in the axial direction to be engaged with the second-speed driven gear 64, the second-speed driven gear 64 is relatively non-rotatably connected to the counter shaft 41 through the second-speed/third-speed changeover shifter 76, whereby the second-speed gear train G2 is established. When the second-speed/third-speed changeover shifter 76 is slid in the axial direction to be engaged with the third-speed driven gear 66, the third-speed driven gear 66 is relatively non-rotatably connected to the counter shaft 41 through the second-speed/third-speed changeover shifter 76, whereby the third-speed gear train G3 is established.

Figure 4:
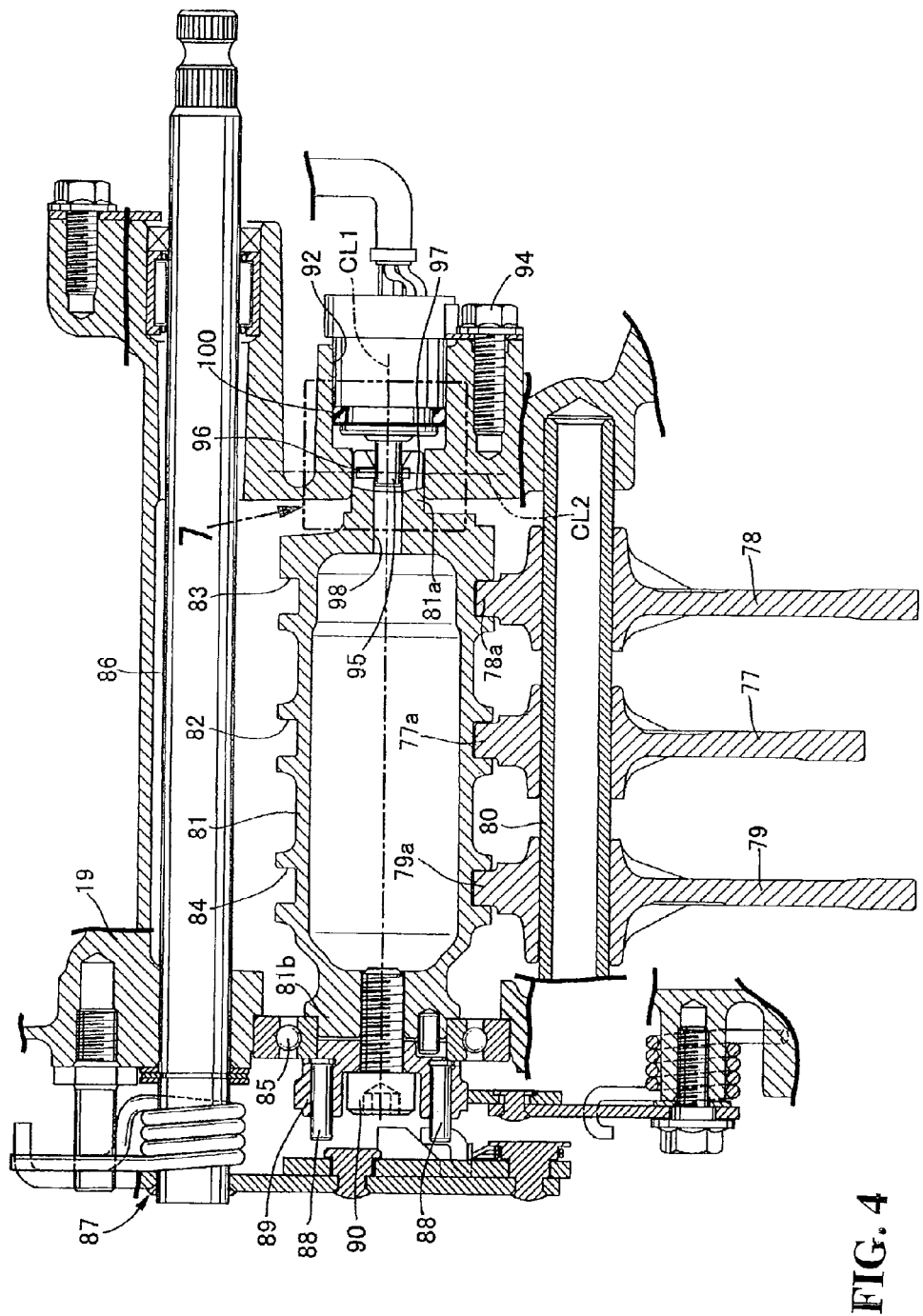
FIG. 4 is a sectional view taken along line 4-4 of FIG. 2.

Referring to FIG. 4 as well, the fifth-speed/sixth-speed changeover shifter 74 is rotatably held by a first shift fork 77, the first-speed/fourth-speed changeover shifter 75 is rotatably held by a second shift fork 78, and the second-speed/third-speed changeover shifter 76 is rotatably held by a third shift fork 79. The first to third shift forks 77 to 79 are axially slidably borne on a shift fork shaft 80 which is supported on the crankcase 19, with its axis parallel to those of the main shaft 40 and the counter shaft 41.

Figure 5:
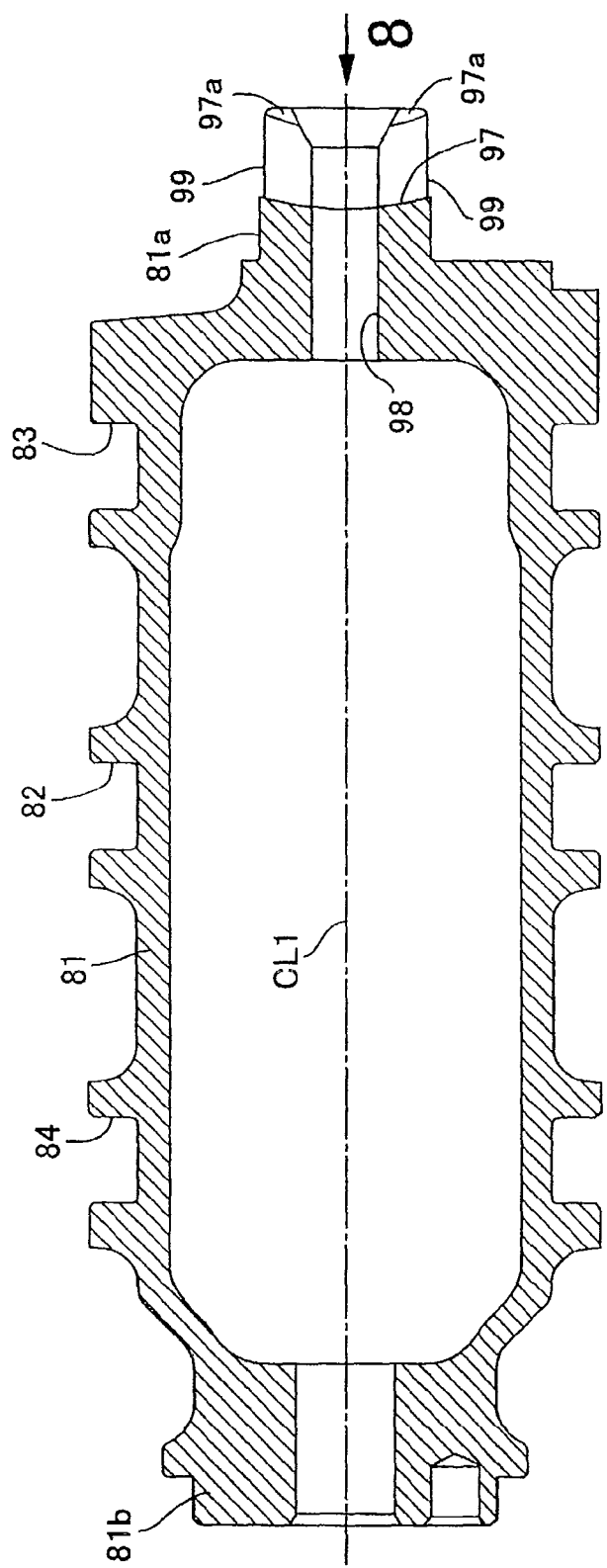
FIG. 5 is a longitudinal sectional view of a shift drum, which is a sectional view taken along line 5-5 of FIG. 8.

Referring to FIG. 5 as well, a shift drum 81 having an axis parallel to that of the shift fork shaft 80 is turnably borne on the crankcase 19. The shift drum 81 is provided in the outer periphery thereof with three guide grooves 82, 83, 84 extending in the circumferential direction of the shift drum 81. Engaging projections 77a, 78a, 79a provided on the first to third shift forks 77 to 79 are engaged with the guide grooves 82 to 84.

Figure 6:
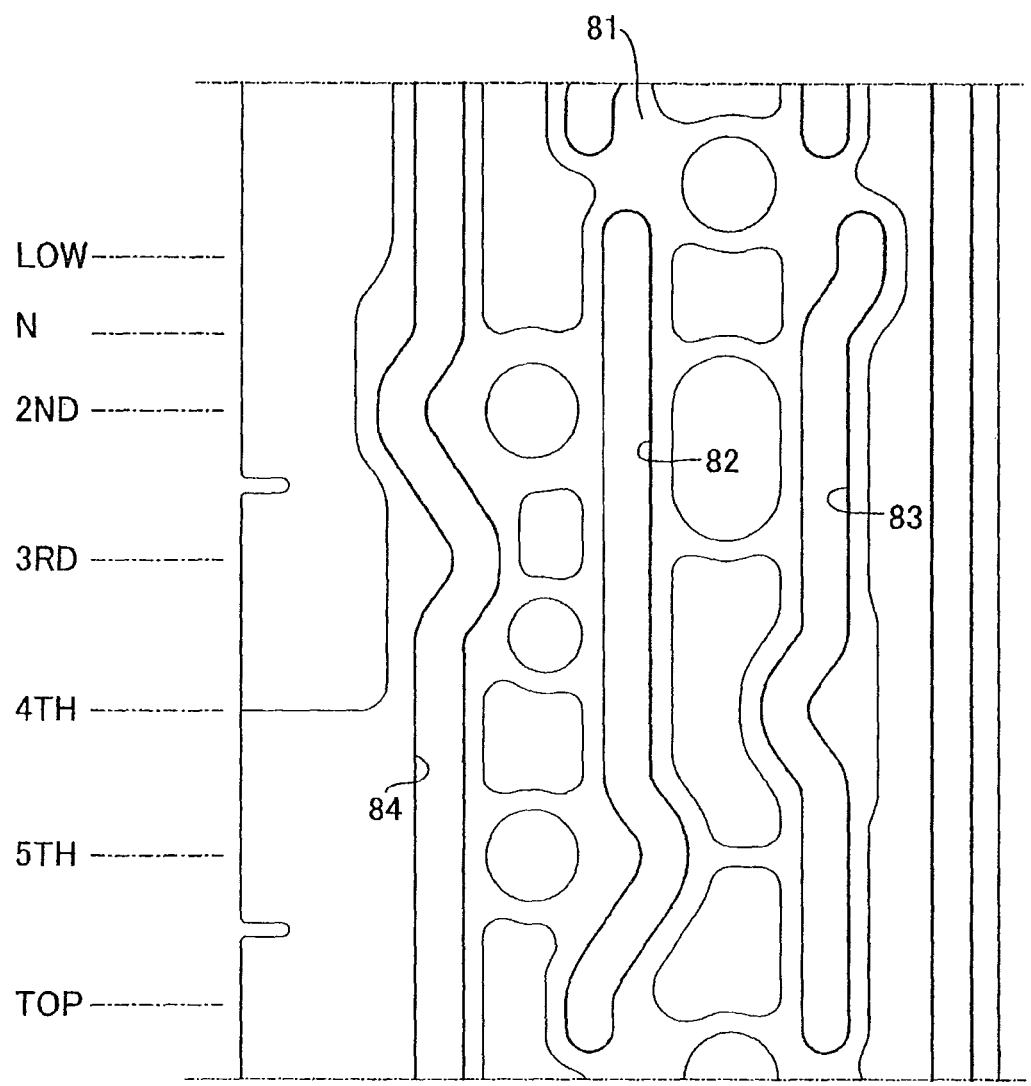
FIG. 6 is a development, in a circumferential direction, of an outer periphery of the shift drum.

At a plurality of parts located at intervals along the circumferential direction of the shift drum 81, as shown in FIG. 6, a plurality of shift positions inclusive of the LOW position for establishing the gear train for the lowest shift position, namely, the first-speed gear train G1, and a neutral position (designated as N) for establishing that none of the gear trains G1 to G6 for the first to sixth shift positions are set. In the present embodiment, the LOW position, the neutral position, a second-speed position (designated as 2ND) for establishing the second-speed gear train G2, a third-speed position (designated as 3RD) for establishing the third-speed gear train G3, a fourth-speed position (designated as 4TH) for establishing the fourth-speed gear train G4, a fifth-speed position (designated as 5TH) for establishing the fifth-speed gear train G5, and a TOP position for establishing the gear train for the highest shift position, namely, the sixth-speed gear train G6, are provided in this order from one end side toward the other end side along the circumferential direction of the shift drum 81.

The guide grooves 82 to 84 are so formed that the positions of the first to third shift forks 77 to 79 on the shift fork shaft 80 are determined according to the angular position of the shift drum 81. With the shift drum 81 turned, therefore, one of the first to sixth gear trains G1 to G6 is selectively established according to the angular position of the shift drum 81. Moreover, both ends of the guide grooves 83 for engagement with the second shift fork 78 relating to selective establishment of the first-speed gear train G1 corresponding to the lowest speed, of the first to third shift forks 77 to 79, are closed at the LOW position and the TOP position. In addition, both ends of the guide groove 82 for engagement with the first shift fork 77 relating to selective establishment of the sixth-speed gear train G6 corresponding to the highest speed, of the first to third shift forks 77 to 79, are also closed at the LOW position and the TOP position.

The shift drum 81 is coaxially and integrally provided with a small-diameter, hollow shaft portion 81a at one axial end thereof. In addition, the shift drum 81 is coaxially and integrally provided with a small-diameter, hollow shaft portion 81b at the other axial end thereof. On the right side with reference to the traveling direction of the motorcycle, the shaft portion 81b on the other end of the shift drum 81 is rotatably bone on the crankcase 19 through a ball bearing 85.

In addition, the shift drum 81 is rotationally driven by an operation of shift position change drive means 87 capable of operating in correspondence with the turning of a shift spindle 86 according to a shifting operation. To one end portion of the shift spindle 86, which penetrates the crankcase 19 with its axis parallel to that of the shift drum 81 and which is rotatably borne on the crankcase 19, a shift lever connected to and interlocked with a change pedal (not shown) is fixed.

To the shaft portion 81b at the other end of the shift drum 81, a shift cam 89 to which a plurality (in this embodiment, six) of driven pins 88, 88 . . . corresponding to the number of speeds are planted is coaxially fixed by a bolt 90. The shift position change drive means 87 is configured so as to rotationally drive the shift drum 81 through rotation in engagement with one of the driven pins 88, 88 . . . . This configuration is a known conventionally configuration. Therefore, a detailed description thereof is omitted.

The shaft portion 81a at the one axial end of the shift drum 81 is fitted directly in a support hole 91 provided in a left side wall of the crankcase 19, and is thereby supported. Into the clearance between the inner periphery of the support hole 91 and the outer periphery of the shaft portion 82a, lubricating oil is supplied which is scattered inside the crankcase 19. Moreover, the left side wall of the crankcase 19 is provided with a sensor mounting hole 92 which is larger in diameter than the support hole 91 and is coaxially continuous with the support hole 91. A shift position sensor 93 for detecting the angular position of the shift drum 81 as an indication of which one of the first-speed to sixth-speed gear trains G1 to G6 is established is mounted to the crankcase 19 by a bolt 94 in such a manner as to be inserted in the sensor mounting hole 92, with an annular seal member 100 therebetween.

Figure 7:
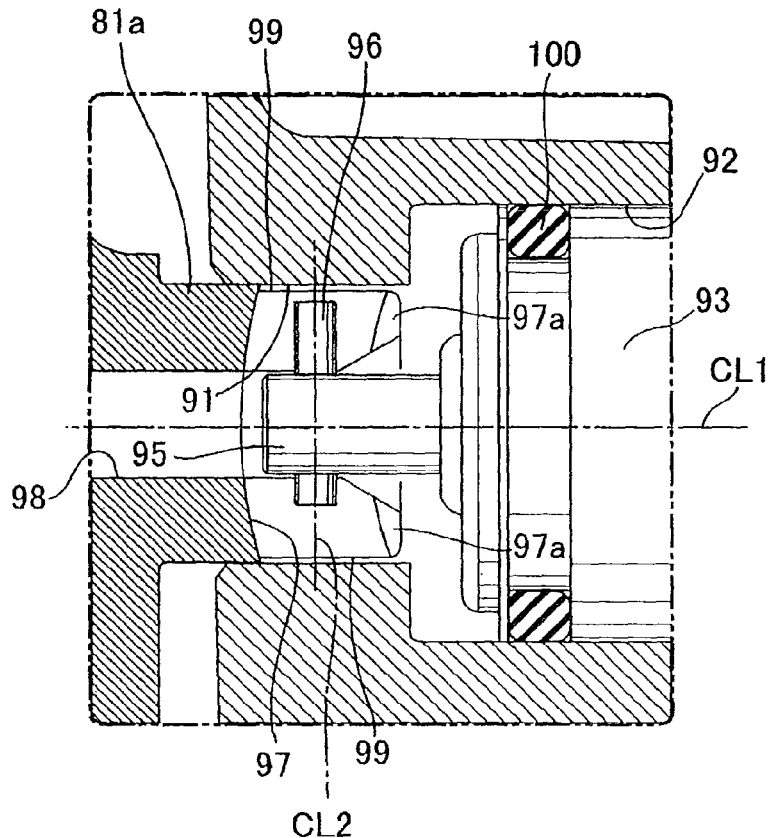
FIG. 7 is an enlarged view of the part designated by arrow 7 in FIG. 4.

Referring to FIG. 7 as well, the shift position sensor 93 has a sensor shaft 95 disposed coaxially with the center axis CL1 of the shift drum 81. An engaging pin 96 disposed along a plane orthogonal to the center axis CL1 of the shift drum 81 and the sensor shaft 95 is inserted and passed through and fixed to the sensor shaft 95 by press fitting, and an engagement groove 97 for engagement with the engaging pin 96 is provided in a shaft end of the shaft portion 81a at the one axial end of the shift drum 81.

Figure 8:
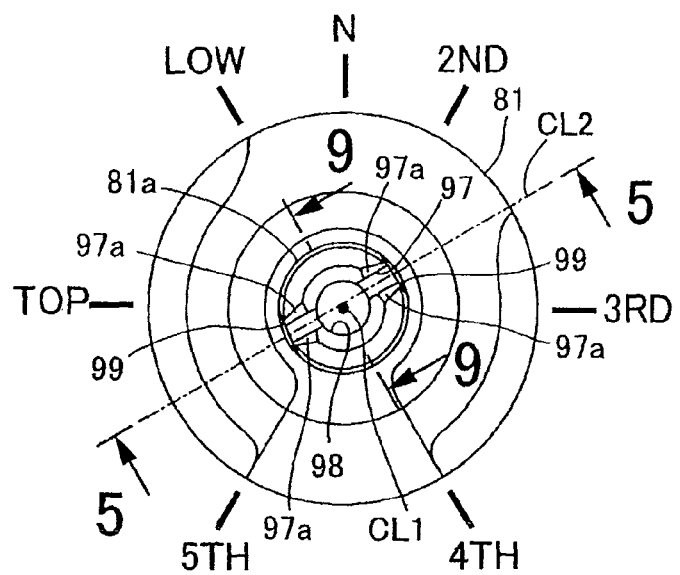
FIG. 8 is a view taken along arrow 8 of FIG. 5.
Figure 9:
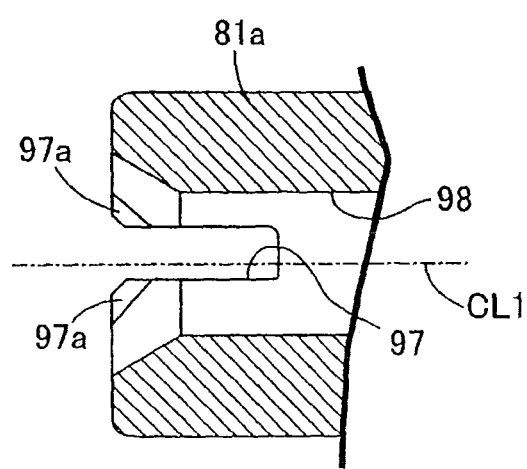
FIG. 9 is a sectional view taken along line 9-9 of FIG. 8.

Further referring to FIGS. 8 and 9 as well, the shaft portion 81a is formed in a hollow cylindrical shape while coaxially having a center hole 98, and the engagement groove 97 is formed at the shaft end of the shaft portion 81a in the state of being divided into portions on both sides of the center hole 98.

Moreover, the width-directional center of the engagement groove 97 and the center axis CL2 of the engaging pin 96 are disposed at a position deviated from the center axis CL1 of the shift drum 81 and the sensor shaft 95. In addition, as shown in FIGS. 4 and 7, the depth of the engagement groove 97 along the axial direction of the shift drum 81 is set so that the engagement groove 97 is located between both axial ends of the support hole 91 provided in the crankcase 19.

The corner portions of the engagement groove 97, on one axial end side of the shift drum 81 are formed with chamfer portions 97a, 97a . . . , and flat surfaces 99, 99, on which both longitudinal ends of the engagement groove 97 front, are each formed by removing a part of an outer peripheral surface of the shaft portion 81a.

Furthermore, as shown in FIGS. 4 and 7, the engaging pin 96 is fixed to the sensor shaft 95 in such a manner that both ends of the engaging pin 96 protrude from the outer periphery of the sensor shaft 95 by different amounts.

The engagement groove 97 has a longitudinal direction set in the direction orthogonal to the direction in which the greatest one of the radial loads on the shift drum 81 is exerted. As shown in FIG. 8, the direction in which the greatest one of the radial loads is exerted is set as the direction in which the center axis CL1 of the shift drum 81 and the LOW position are interconnected.

The operation of the present embodiment will be described below. The shift position sensor 93 for detecting the angular position of the shift drum 81 as an indication of which one of the first-speed to sixth-speed gear trains G1 to G6 is established has the sensor shaft 95 disposed coaxially with the shift drum 81. In addition, the engaging pin 96 disposed along the plane orthogonal to the center axis CL1 of the sensor shaft 95 is inserted and passed through and fixed to the sensor shaft 95. The engagement groove 97 for engagement with the engaging pin 96 is provided at one axial end of the shift drum 81. In this case, the longitudinal direction of the engagement groove 97 is set in the direction orthogonal to the direction in which the greatest one of the radial loads on the shift drum 81 is exerted. Therefore, even if a great radial load is applied to the shift drum 81, a relative displacement between the engagement groove 97 and the engaging pin 96 along the longitudinal direction of the engagement groove 97 would not be generated. Therefore, abrasion or torsion can be restrained from occurring between the engagement groove 97 and the engaging pin 96, and enhanced durability is provided.

In addition, the direction of interconnection between the LOW position at which one end of the guide groove 83 for engagement with the second shift fork 78 relating to selective establishment of the first-speed gear train G1 as the gear train for the lowest speed establishes the first-speed gear train G1, of the plurality of shift positions set at intervals along the circumferential direction of the shift drum 81, and the center axis CL1 of the shift drum 81 is determined as the direction in which the greatest one of the radial loads on the shift drum 81 is exerted. Therefore, this direction is optimum as the direction of action of the greatest one of the radial loads exerted on the shift drum 81, and durability can be enhanced. More specifically, other than the LOW position, the TOP position is also a position, along the circumferential direction of the shift drum 81, at which end portions of the guide grooves 82 and 83 are closed. Therefore, at the TOP position, also, a comparatively great radial load acts on the shift drum 81. However, since the LOW position is used more frequently than the TOP position and the load at the time of down shift by treading-on is great at the LOW position, the selection of the LOW position for the setting of the direction in which the greatest one of the radial loads on the shift drum 81 is exerted is optimum, and durability can thereby be enhanced, as compared with the case where the TOP position is selected for the setting.

In addition, the engagement groove 97 is formed at the shaft end of the shaft portion 81a which the shift drum 81 integrally and coaxially possesses at one axial end thereof. The shaft portion 81a is fitted in and supported by the support hole 91 provided in the crankcase 19, in such a manner that the lubricating oil is supplied into the clearance between the shaft portion 81a and the inner periphery of the support hole 91. Therefore, the lubricating oil supplied into the clearance between the inner periphery of the support hole 91 and the outer periphery of the shaft portion 81a can be guided to the shaft end of the shaft portion 81a, and supplied into the clearance between the engagement groove 97 and the engaging pin 96.

The engaging pin 96 is press fitted in the sensor shaft 95, and the depth of the engagement groove 97 along the axial direction of the shift drum 81 is set that the engagement groove is located between both axial ends of the support hole 91. Even if the engaging pin 96 press fitted in the sensor shaft 95 is displaced in a direction for slipping out of the sensor shaft 95. Therefore, movement of the engaging pin 96 is restricted by the inner periphery of the support hole 91, so that the engaging pin 96 is inhibited from being disengaged from the sensor shaft 95. Consequently, connection of the shift position sensor 93 to the shift drum 81 is maintained.

In addition, the width-directional center of the engagement groove 97 and the center axis CL2 of the engaging pin 96 are set at a position deviated from the center axis CL1 of the shift drum 81 and the sensor shaft 95. In connecting the shift position sensor 93 to the shift drum 81, therefore, an error in the angular position of the shift position sensor 93 relative to the shift drum 81 can be prevented from being generated in assemblage.

The corner portions of the engagement groove 97 on one axial end side of the shift drum 81 are formed with the chamfer portions 97a, 97a . . . . In engaging the engaging pin 96 with the engagement groove 97, therefore, the engaging pin 96 can be guided by the chamfer portions 97a, 97a . . . , whereby the engaging operation can be facilitated.

In addition, the flat surfaces 99, 99 on which both longitudinal ends of the engagement grooves 97 front are each formed by removing a part of the outer peripheral surface of the shaft portion 81a. Therefore, burrs generated upon machining of the engagement groove 97 can be securely removed by the formation of the flat surfaces 99 . . . , whereby smooth turning of the shift drum 81 can be ensured.

Further, the engaging pin 96 is fixed to the sensor shaft 95 so that both ends of the engaging pin 96 protrude from the outer surface of the sensor shaft 95 by different amounts. This ensures that the angular position of the shift position sensor 93 relative to the shift drum 81 can be easily checked by visual observation. Consequently, mis-assembly of the shift position sensor 93 can be prevented from occurring.

While one embodiment of the present invention has been described above, the invention is not to be restricted to the above embodiment, and various design modifications can be made without departure from the invention as defined by the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for a saddle vehicle, comprising:
   gear trains for a plurality of shift positions by which an output of an engine is outputted through stepwise speed change;
   a shift drum including an outer periphery with a plurality of guide grooves for individual engagement with a plurality of shift forks for changeover of selective establishment of said gear trains and which is turnably borne on a crankcase of said engine; and
   a shift position sensor including a sensor shaft disposed coaxially with said shift drum and being operative to detect the angular position of said shift drum as an indication of which one of said gear trains for said plurality of shift positions is established, with an engaging pin disposed along a plane orthogonal to a center axis of said sensor shaft being inserted and passed through and fixed to said sensor shaft, and with an engagement groove for engagement with said engaging pin being provided at one axial end of said shift drum wherein a longitudinal direction of said engagement groove is set in a direction orthogonal to a direction in which a greatest one of radial loads on said shift drum is exerted;
   wherein a width-directional center of said engagement groove and a center axis of said engaging pin are disposed at a position deviated from said center axis of said shift drum and sensor shaft.

2. The transmission for the saddle vehicle according to claim 1, wherein a plurality of shift positions inclusive of a LOW position for establishing said gear train for a lowest shift position and a neutral position for establishing none of said gear trains for said plurality of shift positions are set at a plurality of parts located at intervals along the circumferential direction of said shift drum, one end of said guide groove for engagement with said shift fork relating to selective establishment of said gear train for said lowest shift position, of said plurality of shift forks, is closed at said LOW position, and said direction in which said greatest one of said radial loads is exerted is set as a direction of interconnection of a center axis of said shift drum and said LOW position.

3. The transmission for the saddle vehicle according to claim 2, wherein said engagement groove is formed at a shaft end of a shaft portion which said shift drum integrally and coaxially possesses at one axial end thereof, and said shaft portion is fitted in and supported by a support hole provided in said crankcase, in such a manner that lubricating oil is supplied into a clearance between said shaft portion and an inner periphery of said support hole.

4. The transmission for the saddle vehicle according to claim 2, wherein a corner portion of said engagement groove on one axial end side of said shift drum is formed with a chamfer portion.

5. The transmission for the saddle vehicle according to claim 2, wherein said engaging pin is fixed to said sensor shaft wherein both ends of said engaging pin protrude from an outer periphery of said sensor shaft by different amounts.

6. The transmission for the saddle vehicle according to claim 1, wherein said engagement groove is formed at a shaft end of a shaft portion which said shift drum integrally and coaxially possesses at one axial end thereof, and said shaft portion is fitted in and supported by a support hole provided in said crankcase, in such a manner that lubricating oil is supplied into a clearance between said shaft portion and an inner periphery of said support hole.

7. The transmission for the saddle vehicle according to claim 6, wherein said engaging pin is press fitted into said sensor shaft, and the depth of said engagement groove along an axial direction of the shift drum is set so that said engagement groove is located between both axial ends of said support hole.

8. The transmission for the saddle vehicle according to claim 7, wherein flat planes on both longitudinal ends of said engagement groove front are each formed by removing a part of an outer peripheral surface of said shaft portion.

9. The transmission for the saddle vehicle according to claim 6, wherein a corner portion of said engagement groove on one axial end side of said shift drum is formed with a chamfer portion.

10. The transmission for the saddle vehicle according to claim 6, wherein flat planes on both longitudinal ends of said engagement groove front are each formed by removing a part of an outer peripheral surface of said shaft portion.

11. The transmission for the saddle vehicle according to claim 6, wherein said engaging pin is fixed to said sensor shaft wherein both ends of said engaging pin protrude from an outer periphery of said sensor shaft by different amounts.

12. The transmission for the saddle vehicle according to claim 1, wherein a corner portion of said engagement groove on one axial end side of said shift drum is formed with a chamfer portion.

13. The transmission for the saddle vehicle according to claim 1, wherein said engaging pin is fixed to said sensor shaft wherein both ends of said engaging pin protrude from an outer periphery of said sensor shaft by different amounts.

14. A transmission for a saddle vehicle, comprising:
    gear trains for a plurality of shift positions for providing a stepwise speed change;
    a shift drum including an outer periphery with a plurality of guide grooves for individual engagement with a plurality of shift forks for changeover of selective establishment of said gear trains;
    a shift position sensor including a sensor shaft disposed coaxially with said shift drum and being operative for detecting the angular position of said shift drum as an indication of which one of said gear trains for said plurality of shift positions is established;
    an engaging pin disposed along a plane orthogonal to a center axis of said sensor shaft being inserted and passed through and fixed to said sensor shaft; and
    an engagement groove for engagement with said engaging pin being provided at one axial end of said shift drum wherein a longitudinal direction of said engagement groove is set in a direction orthogonal to a direction in which a greatest one of radial loads on said shift drum is exerted;
    wherein a width-directional center of said engagement groove and a center axis of said engaging pin are disposed at a position deviated from said center axis of said shift drum and sensor shaft.

15. The transmission for the saddle vehicle according to claim 14, wherein a plurality of shift positions inclusive of a LOW position for establishing said gear train for a lowest shift position and a neutral position for establishing none of said gear trains for said plurality of shift positions are set at a plurality of parts located at intervals along the circumferential direction of said shift drum, one end of said guide groove for engagement with said shift fork relating to selective establishment of said gear train for said lowest shift position, of said plurality of shift forks, is closed at said LOW position, and said direction in which said greatest one of said radial loads is exerted is set as a direction of interconnection of a center axis of said shift drum and said LOW position.

16. The transmission for the saddle vehicle according to claim 14, wherein said engagement groove is formed at a shaft end of a shaft portion which said shift drum integrally and coaxially possesses at one axial end thereof, and said shaft portion is fitted in and supported by a support hole provided in said crankcase, in such a manner that lubricating oil is supplied into a clearance between said shaft portion and an inner periphery of said support hole.

17. The transmission for the saddle vehicle according to claim 16, wherein said engaging pin is press fitted into said sensor shaft, and the depth of said engagement groove along an axial direction of the shift drum is set so that said engagement groove is located between both axial ends of said support hole.

* * * * *